(12) United States Patent
Kaminsky et al.

(10) Patent No.: US 7,844,561 B2
(45) Date of Patent: Nov. 30, 2010

(54) PROBLEM DETERMINATION RULES PROCESSING

(75) Inventors: David Louis Kaminsky, Chapel Hill, NC (US); John Michael Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 12/136,792

(22) Filed: Jun. 11, 2008

(65) Prior Publication Data

US 2009/0048998 A1 Feb. 19, 2009

Related U.S. Application Data

(62) Division of application No. 11/260,815, filed on Oct. 27, 2005, now Pat. No. 7,412,432.

(51) Int. Cl.
*G06N 5/00* (2006.01)

(52) U.S. Cl. .......................................... 706/47; 706/45

(58) Field of Classification Search .................. 706/47, 706/45
See application file for complete search history.

(56) References Cited

U.S. PATENT DOCUMENTS

| 5,802,303 | A | 9/1998 | Yamaguchi |
| 5,918,020 | A | 6/1999 | Blackard et al. |
| 6,047,313 | A | 4/2000 | Hashimoto et al. |
| 6,178,424 | B1 | 1/2001 | Okumara et al. |
| 6,304,900 | B1 | 10/2001 | Cromer et al. |
| 6,654,810 | B1 | 11/2003 | Pierre et al. |
| 6,748,445 | B1 | 6/2004 | Darcy et al. |
| 2003/0061348 | A1 | 3/2003 | Jacobs |
| 2003/0112752 | A1 | 6/2003 | Irifune et al. |
| 2004/0249903 | A1 | 12/2004 | Ha et al. |
| 2005/0068899 | A1 | 3/2005 | Murphy et al. |

OTHER PUBLICATIONS

Cordon, et al., Genetic Algorithms and Fuzzy Logic in Control Processes, Technical Report DECSAI-95109, University of Granada, Department of Computer Science and Artificial Intelligence, Mar. 1995, pp. 1-28.*

Mendes, et al, Discovering Fuzzy Classification Rules with Programming and Co-evolution, PKDD 2001, LNAI 2168, 2001, pp. 314-325.*

Cordon, et al., Genetic Algorithms and Fuzzy Logic in Control Processes, Technical Report DECSAI- 95109, University of Granada, Department of Computer Science and Artificial Intelligence, Mar. 1995, pp. 1-28.*

* cited by examiner

*Primary Examiner*—Wilbert L Starks, Jr.
(74) *Attorney, Agent, or Firm*—Stephen A. Calogero, Esq.; Steven M. Greenberg, Esq.; Carey Rodriguez Greenberg & Paul LLP

(57) ABSTRACT

A context-sensitive pre-evaluation analysis of a set of rules is performed based on the circumstance or the current state of a rule clause directed to an infrequently changing condition. A group of multiple-clause rules are identified which each have a clause defining an infrequently changing condition for evaluating a state of a resource. The current state of the resource is monitored. If the identified group of multiple-clause rules, which cannot evaluate as TRUE under the context of the current state the resource, the identified group of multiple-clause rules are excluded from consideration by the rules engine. The rules engine will then encounter fewer rules to evaluate for a solution. The identified group of multiple-clause rules is further analyzed in the context of the infrequently changing condition for the current resource state. State metrics that are defined by clauses of the identified multiple-clause rules, those that cannot evaluate as TRUE, are identified. Those metrics are then also excluded from consideration by the rules engine. Thus, the rules engine will encounter fewer rules and/or event states that cannot be evaluated to a solution. The context-sensitive pre-evaluation analysis of the rules is performed out-of-band as the rules engine traverses the rule.

12 Claims, 6 Drawing Sheets

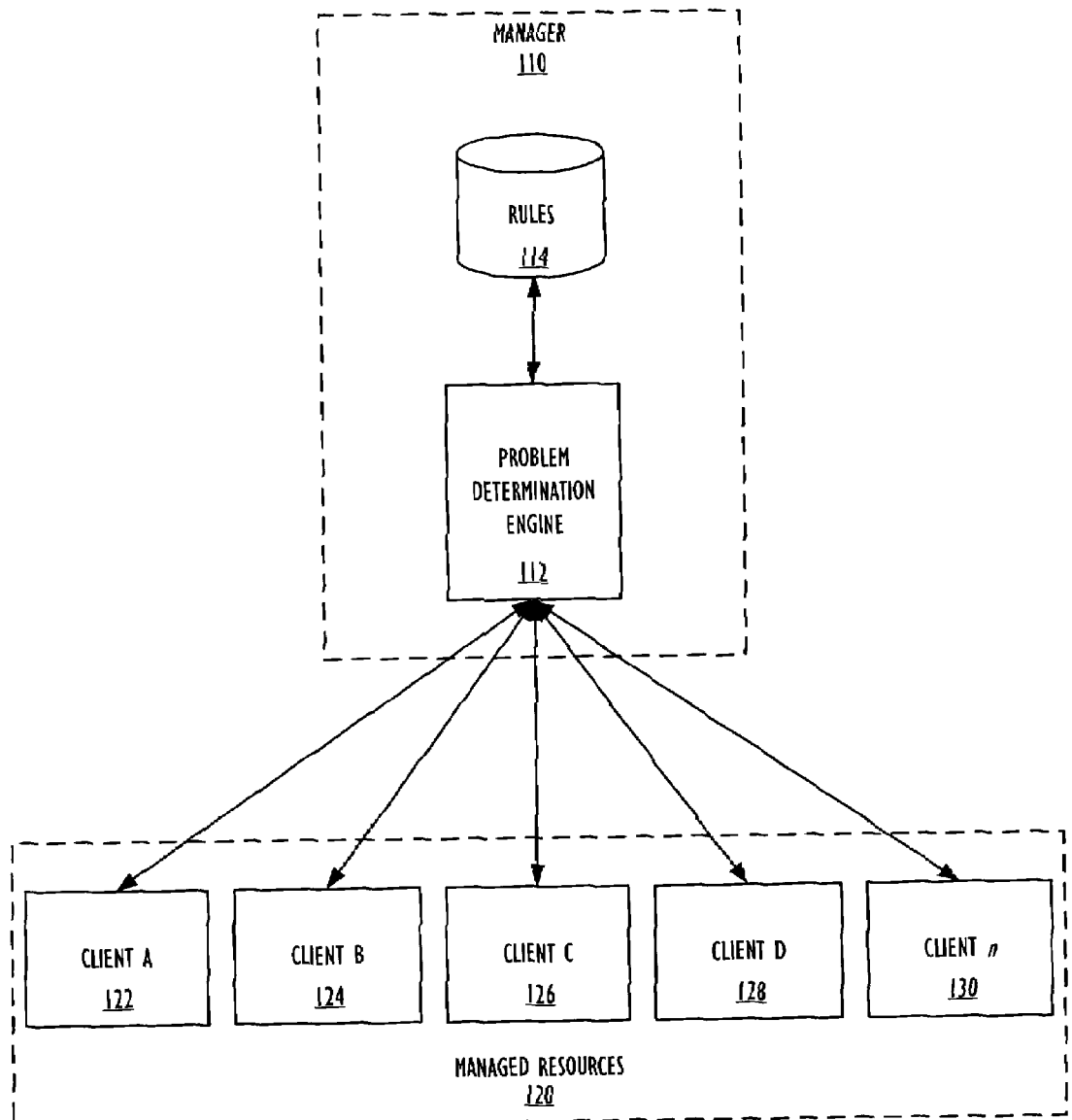

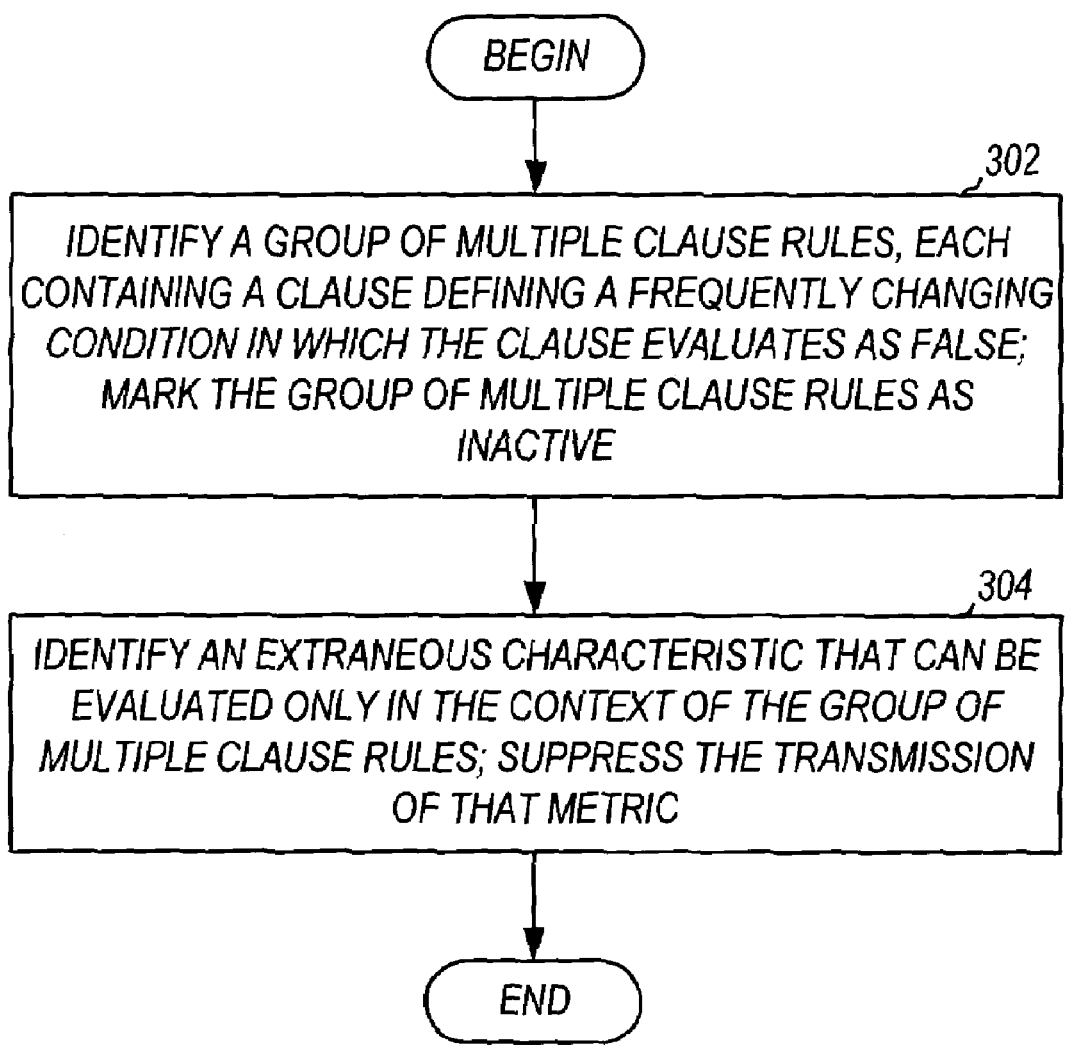

PROBLEM DETERMINATION RULES PROCESSING

CROSS-REFERENCE TO RELATED APPLICATIONS

This application is a Divisional of U.S. application Ser. No. 11/260,815, filed on Oct. 27, 2005, now U.S. Pat. No. 7,412,432 which is incorporated herein by reference in its entirety. Applicants submit that no new matter has been added in the specification.

The present invention relates to providing efficient enforced resource consumption rate limits. In particular, it relates to determining when to recalculate resource availability.

BACKGROUND OF THE INVENTION

The present invention relates to the analysis of rules for application to state event information. More particularly, the present invention relates to context sensitive analysis of rules for evaluating the state of a managed resource.

Within the past two decades the development of raw computing power coupled with the proliferation of computer devices has grown at exponential rates. This growth along with the advent of the Internet have led to a new age of accessibility—to other people, other systems, and to information. This boom has also led to some complexity in the systems. The simultaneous explosion of information and integration of technology into everyday life has brought on new demands for how people manage and maintain computer systems.

Additionally, the complexity of these systems and the way they work together has and will create a shortage of skilled IT workers to manage all of the systems. The problem is expected to increase exponentially, just as the dependence on technology has. As access to information becomes omnipresent through PC's, hand-held and wireless devices, the stability of current infrastructure, systems, and data is at an increasingly greater risk to suffer outages and general disrepair One new model of computing, termed "autonomic computing," shifts the fundamental definition of the technology age from one of computing, to that defined by data. The term "autonomic" comes from an analogy to the autonomic central nervous system in the human body, which adjusts too many situations automatically without any external help. Similarly, the way to handle the problem of managing a complex IT infrastructure is to create computer systems and software that can respond to changes in the IT (and ultimately, the business) environment, so the systems can adapt, heal, and protect themselves. In an autonomic environment, components work together, communicating with each other and with high-level management tools. They can manage or control themselves and each other.

Self healing technologies are one of the pillars of autonomic computing and on demand. Self-healing requires detecting problematic operations (either proactively through predictions or otherwise) and then initiating corrective action without disrupting system applications. The first step toward this direction is problem determination. In an autonomic computing environment, problem determination uses an intelligent control loop to collect system information, analyze it by applying problem determination rules, plan appropriate responses, and then make necessary adjustments to resolve problems. Self-healing systems are typically rule driven—rules define what the system should do to diagnose and correct a problem. However, a conventional problem determination system can have hundreds or thousands of rules, and must evaluate many of these rules frequently.

BRIEF SUMMARY OF THE INVENTION

The present invention is directed to a system, method and software product for performing a context-sensitive pre-evaluation analysis of a rules. Initially, a rule set is analyzed by a rules analyzer to identify the rules containing a clause that defines a resource state, or a characteristic external to the resource state, in which the outcome of the evaluation does not frequently change, i.e., the clause can evaluate to TRUE or FALSE, but it does not change between the two with any frequency. Such a clause may define a computing topology state (resource state) or a temporal state (external to a resource state). Next, the rules analyzer evaluates the clause in the context of the current state of the characteristic/resource. Although the outcome of the condition changes infrequently, the state of the characteristic/resource may constantly change, e.g., time, and thus the state of characteristic/resource metric defined by the clause should be constantly monitored. If the rule clause evaluates TRUE, no action is taken, however, if the clause evaluates FALSE, the rules containing the clause are marked as inactive and not evaluated by the rules engine. Inactivating rules that cannot evaluate as TRUE enables the rules engine to evaluate fewer rules to find a solution for each event state received. The rules analyzer continues to monitor the current state of the resource and adjusts the status of the group of rules containing the infrequently changing condition clause accordingly.

The rules analyzer then identifies one or more characteristics that are extraneous to the solutions of rules in the rules set in the context of the inactive rules and suppresses the sending of metrics for those characteristics. An extraneous characteristic is one that, although defined by a clause in some of the rules of the rule set, will not contribute to the outcome of evaluation of any rule in the rule set. A characteristic defined only in the context of the inactive rules is an extraneous characteristic because regardless of whether or not the clause evaluates as TRUE, the rule will evaluate as FALSE in the context of the infrequently changing condition clause evaluating as FALSE. Therefore, metrics that are extraneous in the context of the infrequently changing condition are suppressed at the managed resource.

Alternatively, the rules analyzer may send parametric information to the managed resource, from which the managed resource can determine which event data are extraneous. The rule clause to the infrequently changing condition may be passed to the managed resource. Using the rule clause, the managed resource is then be responsible for monitoring the current state of the resource metric and determine whether or not the state events metrics should be sent to the rules engine. Consequently, the managed resource will only send the metric data when the rule clause defining the infrequently changing condition evaluates as TRUE, and will suppress the metric data when the rule condition evaluates as FALSE. The reduction in the number of event messages lowers to workload on the rules engine, as well as reduces network traffic.

BRIEF DESCRIPTION OF THE SEVERAL VIEWS OF THE DRAWINGS

FIG. 1 is a simplified diagram depicting the logical elements of a managed resource environment and the interaction paths therebetween as understood in the prior art;

FIG. 3 is a flowchart depicting a high level process for efficiently preprocessing problem determination rules in accordance with an exemplary embodiment of the present invention;

Figure 2A:
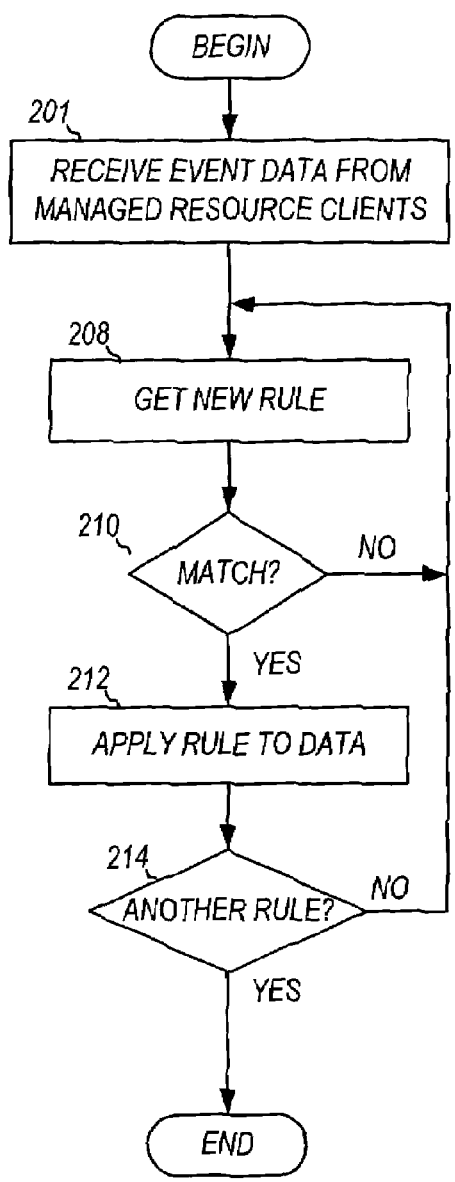
FIGS. 2A and 2B are flowcharts depicting a rules-based problem determination process as known in a prior art.

Other features of the present invention will be apparent from the accompanying drawings and from the following detailed description.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable or usable medium may be utilized. The computer-usable or computer-readable medium may be, for example but not limited to, an electronic, magnetic, optical, electromagnetic, infrared, or semiconductor system, apparatus, device. More specific examples (a nonexhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. In the context of this document, a computer-usable or computer-readable medium may be any medium that can contain, or store for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In a managed resource environment, management components work together, communicating with each other and with high-level management tools for resource problem determination. FIG. 1 is a simplified diagram depicting the logical elements of an exemplary managed resource environment and the interaction paths therebetween. The computing environment is essentially bifurcated into the manager components 110 and the managed resources 120. Managed resources 120 are controlled system components and may be a single resource or a collection of resource clients A-n. (depicted in the figure as clients A-n 122-130) Typically, managed resources 120 are controlled through a series of sensors and effectors (not shown). The sensors provide mechanisms to collect information about the state and state transitions of an element, while the effectors are mechanisms that change the state (configuration) of a client. In the autonomic computing paradigm, for example, the manager implements the control loop for controlling managed resource 120.

For simplicity in describing aspects of the present invention, manager 110 is depicted with only problem determination engine (PDE) 112 that collects, aggregates, filters, manages, and reports details (metrics and topologies), for managed resources 120. Although described in a problem determination environment, the present invention may be implemented in any environment in which a set of preexisting rules are employed for evaluating data for a solution.

PDE 112 employs of problem determination (PD) rules 114 for finding solutions to specific state events generated by managed resources 120. A PD rule generally follows an "if-then" format, such as "if A1, A2, A3," An, then X1, X2, X3, . . . Xn," where each A of the antecedent is a condition or situation is either TRUE or FALSE, and each X of the consequence is an action or a conclusion to be asserted or carried out if the antecedent is evaluated as TRUE. Many rules have multiple clauses, connected by logical AND or OR connectives, and multiple conclusions, connected by a logical AND connective. In operation, PDE 112 receives event state data from managed resources 120, which it analyzes through rules 114 in order to identify, for example, a problem with client 122.

Figure 2B:
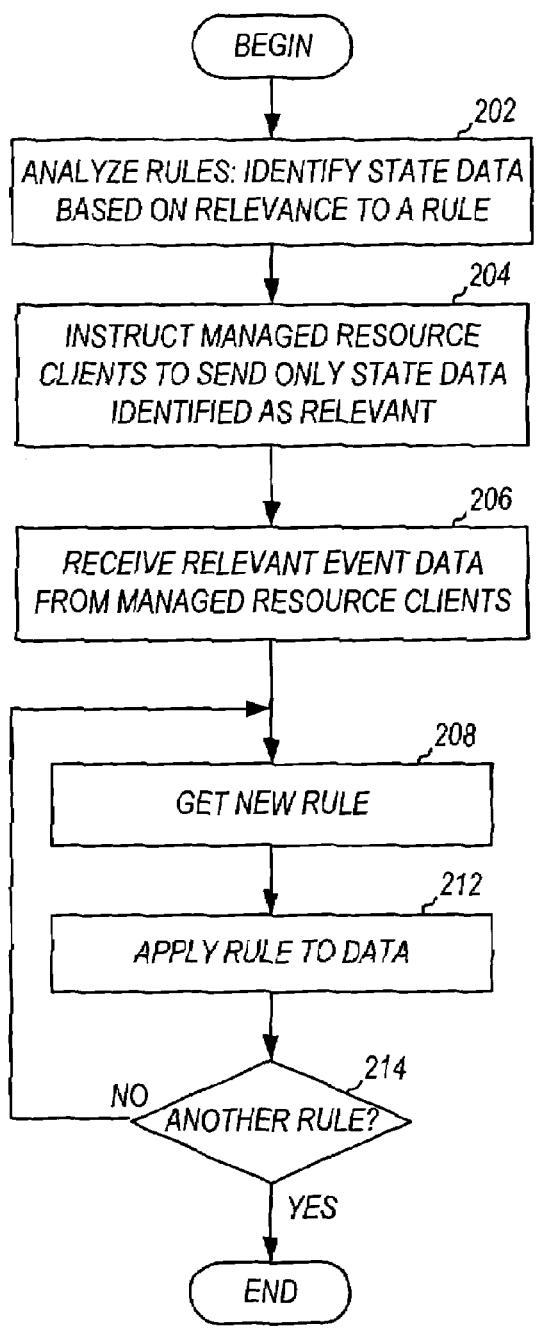

FIGS. 2A and 2B are flowcharts depicting a rules-based PD process as known in a prior art; the flowchart in FIG. 2A depicts a rudimentary PDO process, while the flowchart of FIG. 2B shows a more robust PD process. With regard to the more elementary problem determination process, the process begins with manager 110 receiving event state data from managed resources 120, such as client A 122 (step 202). PDE 112 diagnoses a problem with and of clients 122-130, if any, by evaluating rules 114 for the state data. For each event received, PDE 112 gets a new rule (step 208), determines if the rule is relevant to the event data (step 210). If not, PDE 112 retrieves another new rule (step 208) until a rule is retrieved that is relevant to the event. Then, PDE 112 evaluates the rule's condition(s) (or situation (s)) with the event data (step 212.), if the condition is met, i.e., the rule's antecedent is TRUE for the datum, PDE 112 acts according to the rule's conclusion. If a conclusion cannot be reached, that is, if the rule's antecedent evaluates to FALSE, the process reiterates to step 208 for a new rule until a conclusion is found or all rules are evaluated. It should be mentioned that in some situations multiple rules will be relevant. In those cases, PDE 112 will continue evaluating rules until traversing the entire rule set in database 114.

By way of example, manager 110 receives event data from managed resource 120, specifically client A 122 concerning memory heap size. POE 112 retrieves a first rule and determines if the rule is relevant to memory heap data, i.e., if the rule uses the memory heap metric and therefore can be evaluated with memory heap state data. If not, the rule can never evaluate to TRUE, and the rule is bypassed, and another rule is then retrieved. Even when a rule is retrieved that matches the memory heap metric (i.e., it is possible for the rule to evaluate to TRUE in a particular context); one or more antecedent clauses may evaluate to FALSE, thereby prohibit reaching a conclusion in those contexts. The aim is to correlate at least one rule to the event data then, if the rule evaluates to TRUE, find a conclusion (i.e., determine a problem solution). However, it should be apparent that not all events will have a solution because, there might not be a problem (e.g., a memory heap metric might fall within the normal range). As should be understood, determining a problem using this method might involve attempting to match a significant amount of event state data that simply is not relevant to PD rules 114 used by the manager and, therefore, can never evaluate to TRUE. While this PD process will ultimately find the solution, if a matching rule is available, the process is quite inefficient. Many of the rules will not correlate to event data received from managed resources 120, and therefore the rule cannot be evaluated for the data. Since PDE 112 does not recognize non-matching event state metrics, much of the time PDE 112 is traversing rules 114 attempting to find a match with rules that do not correlate to the event state data.

The problem determination method shown in FIG. 2A can be improved by eliminating all state metrics that could never be evaluated to TRUE by the conditions of rules 114. This improved problem determination method is shown in the flowchart in FIG. 2B. Here the problem determination process begins by analyzing PD rules 114 and identifying any state data that is relevant, that is, identifying any metrics that might evaluate as TRUE for a rule in PD rules 114 (step 202). This metric information is passed to managed resources 120 which then only sends those metrics that are relevant to PD rules 114 which are to evaluate the state data (step 204). Ultimately, in evaluating PD rules 114, many rules may evaluate to FALSE, and the solution fails, but the event metric(s) sent from managed resources 120 will be relevant to the PD rules.

With managed resources 120 filtering the event state data to only those metrics that might evaluate to TRUE, manager 110 then receives the event state data that is relevant to at least one rule in rules database 114 (step 206). For each event received, PDE 112 retrieves rules and sequentially applies the rules to data (step 212) until one evaluates to TRUE (step 214). Here, it should be understood that although a rule may evaluate to TRUE the PD process may not terminate, the rule's conclusion may require PDE 112 to evaluate other PD rules before terminating.

The rules evolution for the process described immediately above is more efficient than that described in the flowchart of FIG. 2A because the rules engine has less event data to consider. This can amount to a substantial gain in efficiency since the rule engine must traverse the entire rules database for each irrelevant event, as well use less network resources.

The pre-evaluation analysis described above with regard to step 202 is termed a "context-free analysis" because PD rules 114 are analyzed for a matching state metric without regard to the contexts under which the state metrics are to be used. Therefore, under the circumstances defined by the rule, the rule may evaluate as FALSE regardless of the state of the event. For example, if a group of PD rules contains only one clause that defines a characteristic or metric, such as CPU utilization, then under some circumstances of the characteristic, at least one rule in the group should evaluate TRUE. However, if each rule in the group also contains a second clause, one which defines an infrequently changing condition (such as a time characteristic), then a rule can only evaluate as TRUE only in the context of the infrequently changing condition evaluating as TRUE. As will be understood from the discussion below, the second clause can define a condition related to a resource state (e.g., computing topologies) or something external to the resource state (e.g., time), but in either case the condition defined by the clause should change relatively infrequently. If, on the other hand, the second clause defining infrequently changing condition cannot evaluate as TRUE, then under those contexts all of the rules in the group will evaluate FALSE, regardless of how the first clause evaluates. For instance, if all rules contain "IF (8 am<time<5 pm) AND (CPU_ULT>B %) THEN X", the rules will evaluate as FALSE under the context of the term defining the infrequently changing characteristic of time, specifically all times after 5 pm until 8 am, regardless of the state of CPU utilization. Therefore the conclusion "X" cannot be reached under the context of the current state of the infrequently changing characteristic. The CPU utilization is a matching metric for the rules, but the CPU utilization metric is extraneous to a solution under the context of the time states after 5 pm until 8 am. The rules cannot evaluate as TRUE regardless of the state of the frequently changing characteristic of CPU utilization, i.e., the value of "B" for CPU utilization.

From the discussion above it should be appreciated that at least four PD evaluation outcomes are possible. First, the metric data received by the PDE do not match a particular PD rule, and are not relevant to that PD rule. Therefore, that PD rule cannot be evaluated for the data. Second, the metric data are relevant, that is it matches a rule clause, but another clause in the PD rule evaluates as FALSE. Consequently, the rule evaluates as FALSE and a solution cannot be found for the event from the particular rule. Thus, in the context of the failure of a rule clause defining an infrequently changing condition, the outcome of any other clause in the rule is extraneous to the PD rule evaluation.

The final two outcomes occur in situations where the event state data are relevant and all but one condition in the rule evaluate as TRUE. Under the context of the infrequently changing rule conditions evaluating as TRUE, whether the rule evaluates as TRUE or FALSE, and reaches a conclusion, depend solely on the evaluation outcome of clause matching the event data. Thus, if a clause defining an infrequently changing condition evaluates as TRUE for a group of rules, the evaluation outcome of any rule in the group will depend on the evaluation outcome of the other clauses in the rule, for instance, the evaluation of clauses defining frequently changing conditions matching the event data. Thus, the PDE's evaluation efficiency can be increased by not evaluating PD rules or state metrics, consistent with the first two cases that cannot evaluate to a solution, but instead evaluating only the rules and state metrics for the latter to cases that may provide a solution.

The present invention performs a context-sensitive pre-evaluation analysis of the rules based on the circumstance or the current state of a characteristic (or resource metric) defined by a rules clause, and not merely on the state used by the rule as performed by the prior art. One purpose for pre-processing the rules is to identify rules that cannot lead to a solution and then exclude their consideration by the rules engine. Once accomplished, the present invention then performs a context-sensitive preevaluation analysis of the metric data matching other clauses in the rules. The purpose of this analysis is to identify metrics that are extraneous to the rules' evaluations in the contexts of a resource state defined by another clause in the rules. Extraneous metrics are then suppressed at the managed resource.

Initially, a rules analyzer analyzes the rules in a rule set to identify rules containing a clause that defines a characteristic condition in which the outcome of the evaluation does not change frequently, such clauses may relate to temporal or computing topology conditions. The rules' clauses can evaluate to TRUE or FALSE, but the outcome does not change between TRUE and FALSE with any frequency. Here, the frequency at which the condition changes should not be confused with the frequency of change of the state of the metric or characteristic identified in the clause. As a practical matter, certain characteristic states may change frequently, e.g., time, but the rule clause may define a condition that changes far less frequently, e.g., (6 am<time≦6 pm). As described hereinafter, the infrequently changing condition identified in the clause will be referred to alternatively as a characteristic condition or a resource condition.

Once a group of rules containing the clause defining the infrequently changing condition is identified, the rules analyzer evaluates the clause under the current state of the characteristic. If the rule clause evaluates TRUE, no action is taken, however, if the clause evaluates FALSE, the rules containing the clause are marked as inactive and are not evaluated by the rules engine. Since the evaluation outcome of those rules is known to be FALSE in the context of current state of the characteristic, the evaluation outcome for every other clause in the rules is extraneous to the rule evaluation and need not be considered. Marking rules that cannot evaluate as TRUE enables the rules engine to evaluate only those rules that might reach a solution for each state event received thereby lowering the number of evaluations to be made by the rules engine. The rules analyzer will continue to monitor the current state of the resource and mark the inactive group of rules containing the clause defining the infrequently changing condition rules as active when the state of the resource evaluates as TRUE for the clause.

Next, the rules analyzer then identifies one or more metrics that are extraneous to the solution(s) of rules in the context of the inactive rules, and then suppresses the transmission of those metrics. As discussed above, metric data that cannot be evaluated by at least one rule in the rules set is irrelevant to the rules evaluations. An extraneous characteristic is one that, although defined by a clause in some of the rules of the rule set, will not contribute to the outcome of evaluation of any rule in the rule set. That is, under certain conditions the metric data are irrelevant to the rule evaluations, but under other conditions, the identical metric data are relevant. A characteristic defined only in the context of the inactive rules is an extraneous characteristic, in the context of the inactive rules because regardless of whether or not the clause defining the characteristic evaluates as TRUE, the rule will evaluate as FALSE because the clause defining the infrequently changing condition will evaluate as FALSE (which was the purpose for inactivating the rules). Thus, event messages for that characteristic metric may be suppressed at the managed resource that generates it. The converse is true in the context of the same rules, when the rules are active. That is, the formerly extraneous characteristic will not only be relevant, but because the clause defining the infrequently changing condition will evaluate as TRUE, whether or not the rule reaches its conclusion now turns on the outcome of the evaluation of the clause defining the formerly extraneous characteristic. Therefore, when the rules are activated, the event messages for the matching metric are turned on at the managed resource and allowed to be sent for rules evaluation.

Alternatively, the rules analyzer may pass the rule clause defining the infrequently changing condition to the managed resource. The managed resource is then responsible for monitoring the current state of the characteristic (or resource metric) and determining whether or not the state event metrics should be sent to the rules engine based on a local evaluation of the state of the resource with the clause defining the infrequently changing condition. The managed resource will send the metric when the rule clause defining the infrequently changing condition evaluates as TRUE and suppress the metric when the rule condition evaluates as FALSE. The reduction in the number of event messages lowers to workload on the rules engine, as well as reduces the network traffic.

FIG. 3 is a flowchart depicting a high level process for efficiently preprocessing analyzing a rules set in accordance with an exemplary embodiment of the present invention. The pre-processing analysis begins by identifying a group of multiple clause rules, in which each rule contains a clause defining an infrequently changing condition that currently evaluates as FALSE (step 302). The infrequently changing condition could be a temporal condition (a time interval), for instance "9 am<time≦5 pm," a computing topology (or set of topologies), for instance "connected to a 1 Gbit Ethernet" or "storage is RAID-5," or some other resource metric. The aim is to pre-evaluate the rule set for rules that need not be evaluated by the rules engine, because the evaluation of those rules cannot lead to a solution in the context of the infrequently changing condition, i.e., under the current state of the characteristic/resource the rules clause defining the infrequently changing condition evaluates as FALSE. Since all of the multiple clause rules containing the clause defining infrequently changing condition will fail, regardless of how any of the other clauses in the rule may evaluate, the rules engine need not evaluate any of those rules. Those rules are marked as inactive and bypassed by the rules engine. The rules engine can then devote its attention to evaluating rules where a solution is uncertain, and might be found, thereby improving its problem determination efficiency.

Similarly, the rule engine need not consider any extraneous characteristics or resource metrics that cannot lead to a solution. Metric information that can only be evaluated in the context of rules that will evaluate as FALSE is extraneous to the rules evaluation since all of those rules will fail to reach a conclusion. Extraneous characteristics include those defined exclusively in frequently changing condition clauses of multiple-clause rules which also contain a second clause defining a second characteristic condition that evaluates as FALSE under the current state of the second characteristic. With regard to the frequently and infrequently changing condition rule clauses, a resource metric or characteristic defined by a frequently changing condition clause is extraneous to the rules evaluation, if, regardless of how the frequently changing rule clause evaluates, the rule cannot lead to a solution because an infrequently changing condition defined in the rule is not satisfied. Therefore, metric data defined by clauses to frequently changing conditions that are only contained in rules that evaluate as FALSE (due to the failure of an infrequently changing condition) can be identified as extraneous and suppressed (step 304). Examples of more frequently changing conditions are CPU utilization, memory space, page space, etc. An example of a multiple clause rule might be "IF (8 am<time<5 pm) AND (CPU_ULT>75%) THEN (start rou_1)".

By design, many PD rules may contain a clause for constricting the problem determination effort to certain infrequently changing conditions, such as "8 am<time<5 pm." No rule with such a clause needs to be evaluated by the PDE, except between 8 am and 5 pm since the condition will always evaluate as FALSE outside the time interval defined by the clause. However, the PDE evaluates all of the active PD rules, regardless of the context of the clause defining the infrequently changing condition. Therefore, in accordance with one embodiment of the present invention, multiple clause rules which contain one clause defining an infrequently changing resource condition are identified prior to being evaluated by the rules engine. When the state of the characteristic or resource metric causes the clause to evaluate to FALSE, the rules are inactivated. When the state changes, and the clause evaluates to TRUE, the rules are activated and allowed to be evaluated by the rules engine.

Certain state metrics may be important only under the context of a particular infrequently changing characteristic, and therefore these metrics will not be defined in any PD rule that does not also contain a clause that defines the particular infrequently changing characteristic. In this situation, the metric can only contribute to a solution of a rule when the clause defining the infrequently changing condition evaluates as TRUE for the current state of the characteristic or resource. If the clause evaluates as FALSE, the metric is extraneous to finding a solution for the rules. In the context where an infrequently changing condition evaluates as FALSE, metrics identified as extraneous may be suppressed from the PDE. Since these state metrics can only lead to a solution when the infrequently changing condition is met, they need not be considered by the PDE and are suppressed at the client. Thus, if the client is not sending extraneous metrics, then they are not flooding the network with unnecessary data, and the server's network subsystem need not process them, leading to more efficient use of the network and the server.

Figure 4:
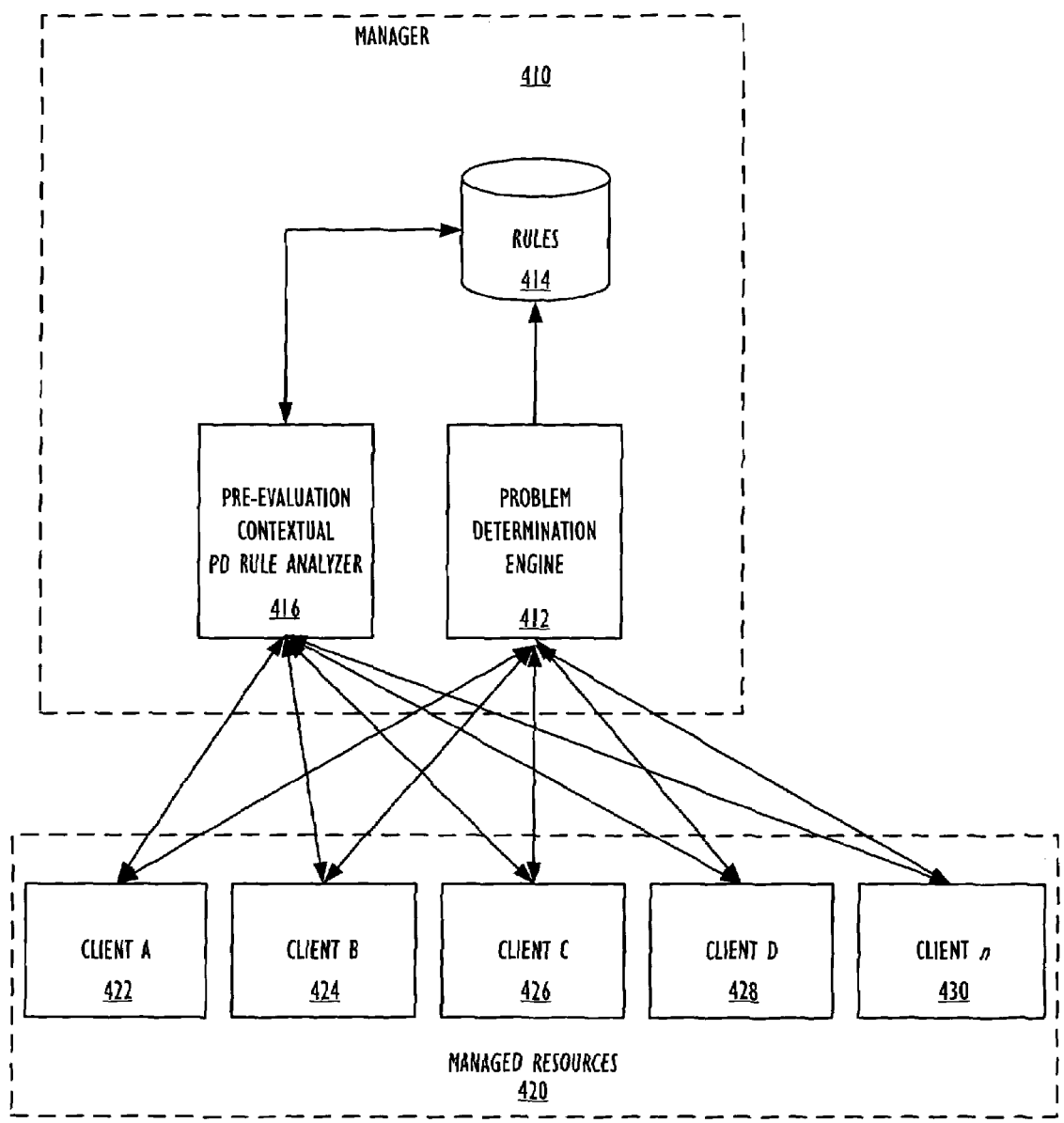
FIG. 4 is a simplified diagram depicting the logical elements of a managed resource environment which includes an out-of-band, pre-evaluation contextual rule analyzer in accordance with an exemplary embodiment of the present invention.

FIG. 4 is a simplified diagram depicting the logical elements of a managed resource environment which includes an out-of-band pre-evaluation contextual rules analyzer in accordance with an exemplary embodiment of the present invention. The present topology is depicted in a problem determination environment, but may be implemented in any system in which the pre-evaluating analysis of a set of rules might potentially reduce the amount of rules to be evaluated. The topology disclosed in FIG. 4 is similar in many regards to that disclosed above in FIG. 1, and therefore only the distinctions will be elaborated. Here again, the computing environment is essentially subdivided into the manager components 410 and the managed resources 420. Managed resources 420 are the controlled system components (clients A-n (422 430). Manager 410 may implement a control loop for controlling managed resources 420, through its management components, i.e., PDE 412 and pre-evaluation contextual PD rule analyzer 416. PDE 412 evaluates PD rules 414 based on state data received from managed resources 420. The operation of PDE 412 will be discussed further below with regard to the operational flowchart depicted in FIG. 6.

Rule analyzer 416, on the other hand, performs an out-of-band, preevaluation analysis of the rules for a rule clause defining an infrequently changing condition in the context of the current state of the characteristic or resource being evaluated by the clause. Essentially, rule analyzer 416 performs four functions. It identifies PD rules that define an infrequently changing characteristic and then monitors the state of the characteristic or resource metric. With the state information, rule analyzer 416 activates inactivates the identified PD rules for consideration by the PDE based on the current state of the resource or characteristic and finally it suppresses messages from the managed resources 420 containing extraneous state metrics. Metric data are extraneous to the rule evaluation if it cannot contribute to a solution to any rule to be evaluated, and therefore extraneous metric data need not be evaluated by the PDE. A metric may be extraneous to the rule evaluation in the context of another rule condition. For example, if a metric is defined only in a set of rules that evaluate as FALSE due to the failure of another rule condition common to the set of rules (i.e., an infrequently changing condition), that metric is extraneous in the context of the condition state(s) which evaluate as FALSE. The operation of rule analyzer 416 may be better understood through a discussion of the pre-evaluation analysis of the PD rules.

Figure 5:
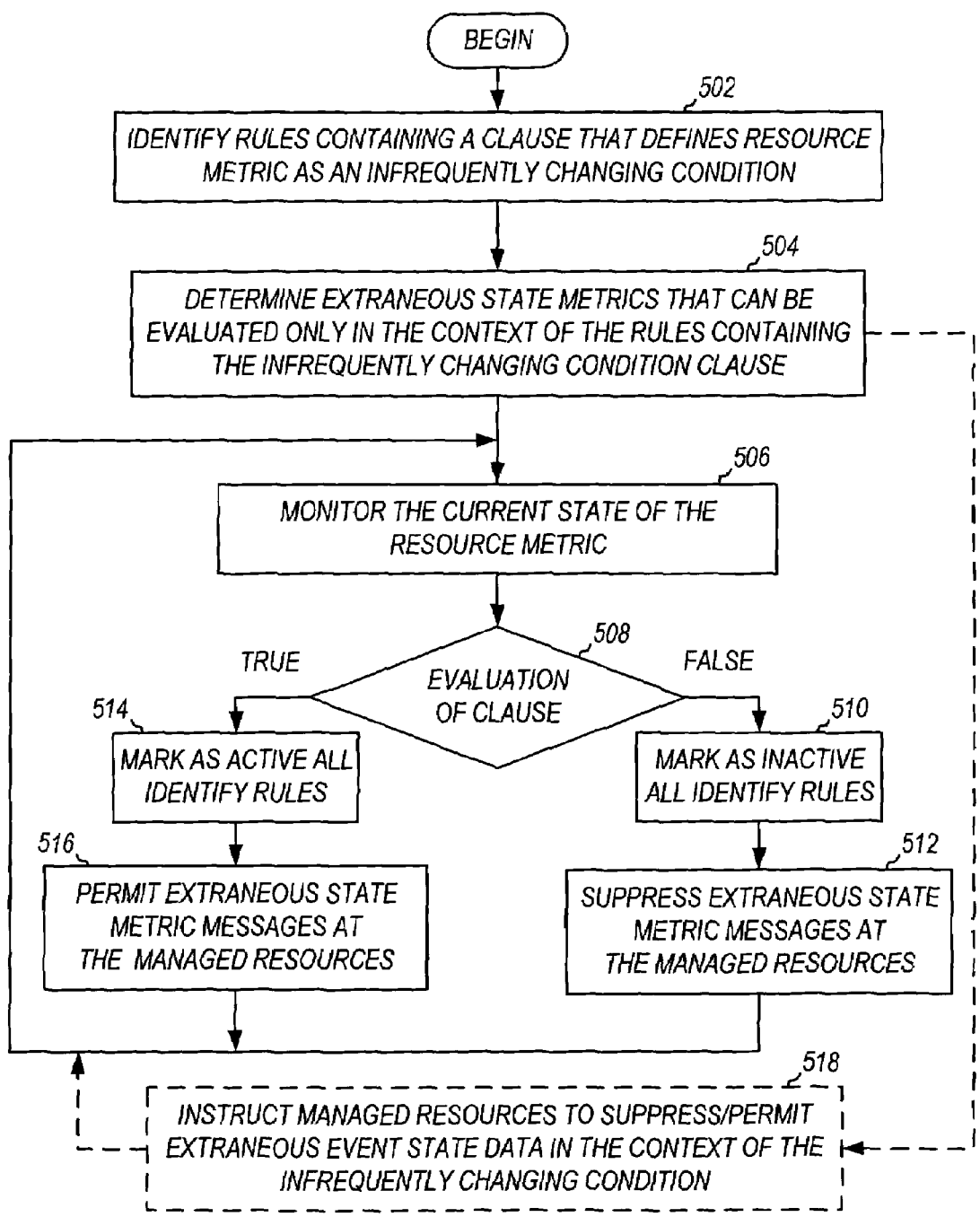
FIG. 5 is a flowchart depicting the process for efficiently analyzing rules and state metrics in the context of an infrequently changing rule condition in accordance with an exemplary embodiment of the present invention.

FIG. 5 is a flowchart depicting the process for efficiently analyzing rules and state metrics in the context of an infrequently changing rule condition in accordance with an exemplary embodiment of the present invention. As mentioned above, the process is implemented as an out-of-band procedure in the rules analyzer, but might instead be incorporated in the PDE or another manager component. The process begins by the rules analyzer identifying rules in the PD rule database that contain a clause which defines infrequently changing rule condition, such as a time interval, computing topology, etc. (step 502). It may be appreciated that the rules might contain several different infrequently changing condition clauses (e.g., time, topology, etc.) or even nested sets of infrequently changing conditions (e.g., (8 am<time<5 pm), (9 am<time<5 pm), (12 pm<time<1 pm). Next, extraneous state metrics are identified as those characteristics that can be evaluated only in the context of the rules containing the infrequently changing conditions (step 504). Here again, the rules may define more than one characteristic for a state metric (e.g., CPU_ULT>70%), (CPU_ULT>80%) and (CPU_ULT>95%). The rules may define several solutions depending on the state of the managed resource, for example, "IF (8 am<time<5 pm) (CPU_ULT>70%) THEN (email ssmith@us.ibm.com) . . . "IF (8 am<time<5 pm) (CPU_ULT>80%) THEN (email ssmith@us.ibm.com; gbrown@us.ibm.com)>> and finally, "IF (8 am<time<5 pm) (CPU_ULT>95%) THEN (email ssmith@us.ibm.com; gbrown@us.ibm.com) (start rou_1)". Alternatively, the PD rules may also define several solutions in the context of the state of the resource, for example, "IF (8 am<time<5 pm) (CPU_ULT>70%) THEN (email ssmith@us.ibm.com)>> and" IF (12 pm<time<1 pm) (CPU_ULT>70%) THEN (email gbrown@us.ibm.com).)".

In either case, the rules analyzer monitors the state of the resource (step 506). At each time iteration, or change detected in the resource state, the rules analyzer evaluates the clause defining the infrequently changing condition (step 508). If the clause defining the infrequently changing condition evaluates as FALSE, the rules with the clause are marked as inactive, and bypassed by the PDE (step 510). This reduces the workload for the PDE in each PD rule traversal because there are fewer active rules to evaluate. As a practical matter, the rules analyzer may create a condition-to-resource state table for the PD rules and merely enter the table to determine which rules are to be considered by the PDE in the context of the infrequently changing condition for the current resource state.

Next, the rules analyzer suppresses the extraneous state metric message at the managed resources (step 512). Alternatively, the rules analyzer may shift the workload from itself to the managed resources after identifying the extraneous metric in step 504, by merely notifying the managed resources of the extraneous state metric and the context for in which the state metric event messages are extraneous. The managed resources can then suppress the extraneous state metric messages autonomously.

In any case, the process iterates back to step 506, and continues monitoring the resource state by making evaluations of the infrequently changing condition clause (step 508). At some point, an evaluation of the clause directed to the infrequently changing condition will be TRUE. In that situation, the rules with the clause are marked as active and evaluated by the PDE (step 514). Then, the rules analyzer instructs the managed resources to permit messages for the previously extraneous state metrics to be sent to the manager (step 516). Because the rule analysis process supplements the problem determination process, it continues to integrate through step 504 during problem determinations.

The presently described invention may be better understood by way of example. Consider manager 410 and managing resource 420, with the following rules in rules database 414 (each depicted in FIG. 4), for the use of manager 410:

1. IF (CPU_Util>0.7) THEN A
2. IF (8 am<time<5 pm) AND (CPU_Util>0.6) THEN B
3. IF (8 am<time<5 pm) AND (free_space<0.1) THEN C
4. IF (8 am<time<5 pm) AND (page_hit_percentage<0.99) THEN D The rule conclusion, the "THEN" part, is not particularly relevant to the preevaluation analysis of the rules, only the antecedent clause conditions. If, as in the prior art, no rule analysis is performed, then under all circumstances managing resource 420 would send all event metrics to manager 410. This would include relevant metrics (CPU and free space) and irrelevant ones (perhaps swap rate, etc). According to the prior art rules analysis method, it would be determined that the metrics of CPU util, free space and page_hit_percentage are used by manager 410, and therefore managing resource 420 would send those metrics. However, it would also be determined that swap_rate is not relevant to any of the rules (and other unused metrics), and managing resource 420 would not send those metrics to manager 410.

In contrast with the context-free analysis of the rules performed in the prior art analysis method, the dynamic analysis would determine the context in which metrics will be used by manager 410. For example, between 5 pm and 8 am, the temporal clause in rules 2, 3 and 4 will evaluate as FALSE. Thus, regardless of how the other clauses in those rules evaluate, the rules 2, 3 and 4 will evaluate as FALSE between 5 pm and 8 am. However, each event received by manager 410 will be evaluated using all active rules available form rules database 414. Therefore, rules 2, 3 and 4 are marked as inactive between 5 pm and 8 am so that manager 410 will not waste time evaluating rules that cannot evaluate as TRUE.

Furthermore, in the context of the inactive rules, certain metric may be determined to extraneous to a solution. Any metric that cannot evaluate to a solution is extraneous, e.g., irrelevant metrics. However, other metrics may be extraneous only in certain contexts, for example, in the case where those metrics are defines only by clauses of inactive rule (those metrics are extraneous in the context of the inactive rules). Between 5 pm and 8 am, no rule uses free_space and page_hit_percentage, so free_space and page_hit percentage metrics are extraneous to a solution to the active rules. Therefore, the extraneous metric, e.g., free_space and page_hit_percentage, can be suppressed by managing resource 420 and not sent to manager 410. Note that CPU Utiliziation metric would continue to be sent since it does not qualify as an extraneous metric, i.e., it is used by rule 1, which does not have a corresponding clause to a temporal condition. Therefore, between 5 pm and 8 am, many fewer metrics are sent from managing resource 420 to manager 410, which results in a significant reduction in network and server usage.

Figure 6:
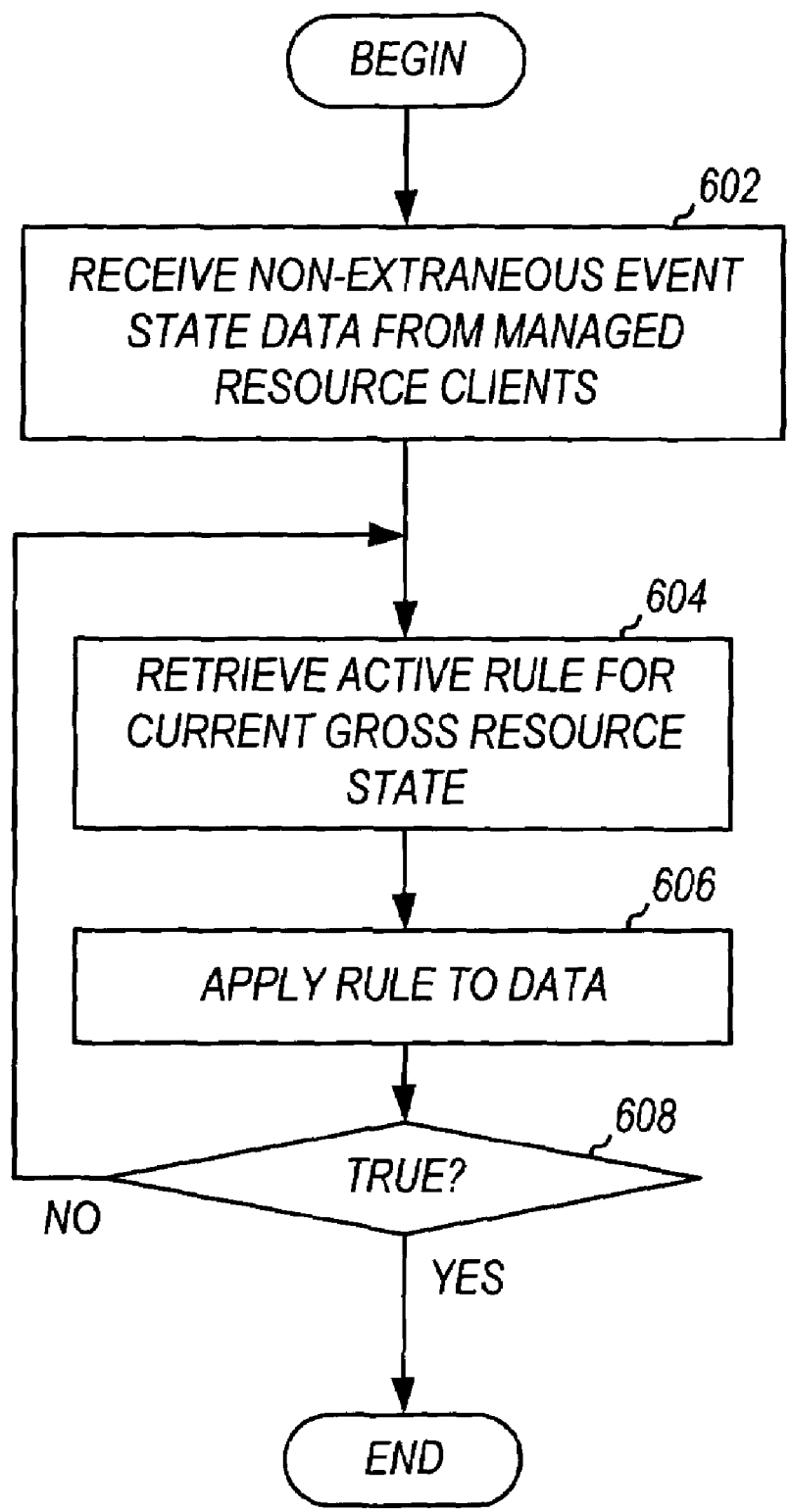
FIG. 6 is a flowchart depicting a process for evaluating rules and state metrics pre-evaluation analyzed in the context of an infrequently changing rule condition in accordance with an exemplary embodiment of the present invention.

FIG. 6 is a flowchart depicting a process for evaluating PD rules and state metrics pre-evaluation analyzed in the context of an infrequently changing rule condition in accordance with an exemplary embodiment of the present invention. The process begins with the PDE receiving an event state message from a managed resource (step 602). Because the metrics from the managed resources have been filtered for extraneous metric data, only non-extraneous data is received at the PDE. The evaluation outcome of any PD rule for evaluating the non-extraneous event state data is uncertain until the rule has been applied to the event data. Next, an active rule is retrieved (step 604). Here again, since the PD rules have been pre-evaluation analyzed in the context of the state of the infrequently changing condition, rules that cannot evaluate to TRUE in the context of the resource are not considered. Only the remaining rules, those rules that may evaluate to a solution, are evaluated by the PDE by applying the rule to the event data (step 606). If the rule evaluates to FALSE, the process iterates through to retrieve another and evaluate another rule (steps 604-608) until a solution is found in the rules, or the entire rules database is traversed. Finding a solution may end the process, but often the rules engine will traverse the entire rules database for a supplemental solution.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer usable medium having computer usable program code for performing a context-sensitive pre-evaluation analysis of a set of problem determination rules, said computer program product comprising:
    computer usable program code to identify at least one multiple-clause rule from a plurality of rules, said at least one multiple-clause rule containing a first clause defining a first characteristic condition in a context of a state of the first characteristic;
    computer usable program code to ascertain a current state of the first characteristic;
    computer usable program code to exclude the identified at least one multiple-clause rule from evaluation with the plurality of rules on the basis of the first clause in a context of the current state of the first characteristic;
    computer usable program code to exclude data from evaluation in the context of the identified at least one multiple-clause rule; and
    computer usable program code to report details of metrics and topologies for the managed resources.

2. The computer program product recited in claim 1, wherein the computer usable program code to exclude the identified at least one multiple-clause rule from evaluation with the plurality of rules on the basis of the first clause in a context of the current state of the first characteristic, further comprises computer usable program code to identify an extraneous metric, said extraneous metric being defined exclusively in a second clause of the identified at least one multiple-clause rule and being undefined in unidentified rules of the plurality of rules; and
    computer usable program code to exclude data for the extraneous metric from evaluation.

3. The computer program product recited in claim 2, wherein the first clause and the second clause of the at least one rule are connected by a logical AND connective.

4. The computer program product recited in claim 3, wherein the computer usable program code to exclude the identified at least one multiple-clause rule from evaluation with the plurality of rules on the basis of the first clause in a context of the current state of the first characteristic, further comprises:
    computer usable program code to evaluate the current state of the of the first characteristic with the first clause of the identified at least one multiple-clause rule;
    computer usable program code to realize an evaluation outcome of FALSE; and
    computer usable program code to set the identified at least one multiple-clause rule as unavailable for evaluation.

5. The computer program product recited in claim 4, wherein the computer usable program code to set the identified at least one multiple-clause rule as unavailable for evaluation, further comprises computer usable program code to mark the identified at least one multiple-clause rule as inactive.

6. The computer program product recited in claim 4, wherein computer usable program code to exclude data for the extraneous metric from evaluation, further comprises computer usable program code to instruct a client to suppress messages containing event state data for the extraneous metric.

7. The computer program product recited in claim 4, wherein computer usable program code to exclude data for the extraneous metric from evaluation, further comprises computer usable program code to notify a client of the first characteristic condition in context of a state of the first characteristic.

8. The computer program product recited in claim 4, wherein the first characteristic condition defines one of a temporal state and a computing topological state.

9. A system for performing a context-sensitive, pre-evaluation analysis of a set of problem determination rules comprising:
    a rules database to store a plurality of problem determination rules;
    a rule engine, in communication with the rules database and a managed resource, to receive event state data from the managed resource, retrieve a rule from rules database, and evaluate the rule with the event state data;
    an out-of-line rules analyzer, in communication with the rule engine, the rules database and a managed resource, to identify at least one multiple-clause rule from the rules database, said at least one multiple-clause rule containing a first clause defining a first characteristic condition in a context of a state of the first characteristic, to input a current state of the first characteristic, to exclude the identified at least one multiple-clause rule from evaluation by the rules engine on the basis of the first clause in a context of the current state of the first characteristic, to identify an extraneous metric being defined exclusively in a second clause of the identified at least one multiple-clause rule and being undefined in unidentified rules of the plurality of rules, and to suppress event state data for the extraneous metric from evaluation at the managed resource and to generate a report of the details of metrics and topologies for the managed resources.

10. The system recited in claim 9, wherein the out-of-line rules analyzer evaluates the current state of the of the first characteristic with the first clause of the identified at least one multiple-clause rule, realizes an evaluation outcome of FALSE, and sets the identified at least one multiple-clause rule as unavailable for evaluation.

11. The system recited in claim 9, wherein the out-of-line rules analyzer marks the identified at least one multiple-clause rule in the rules database as inactive.

12. The system recited in claim 9, wherein the out-of-line rules analyzer instructs the managed resource to suppress messages containing event state data for the extraneous metric.

* * * * *